Aug. 8, 1967 J. S. HALL 3,335,330
MOUNTING PAN ASSEMBLY FOR ELECTRICAL PANELBOARD
Filed July 15, 1964 2 Sheets-Sheet 1
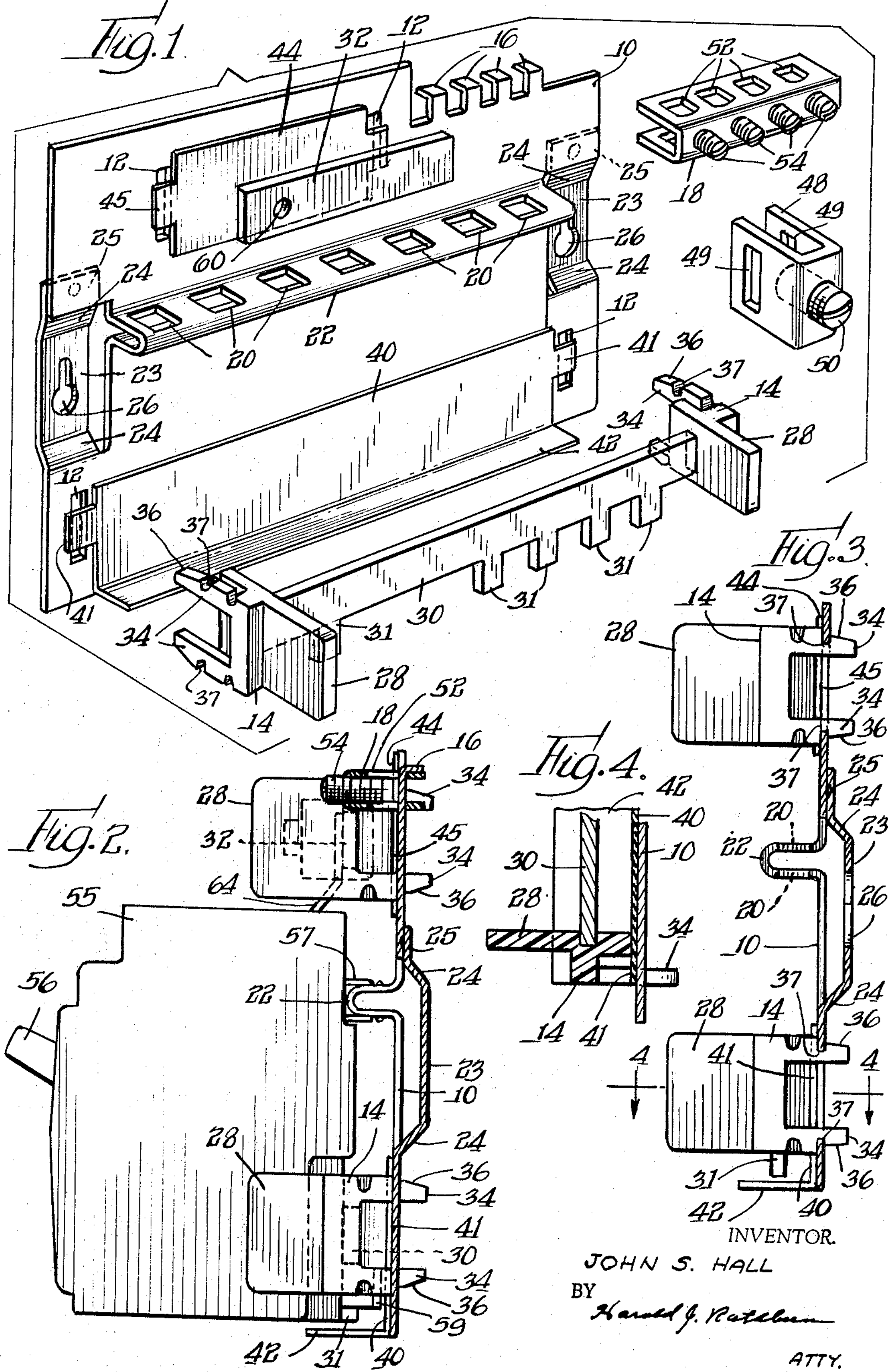

Aug. 8, 1967 J. S. HALL 3,335,330
MOUNTING PAN ASSEMBLY FOR ELECTRICAL PANELBOARD
Filed July 15, 1964 2 Sheets-Sheet 2
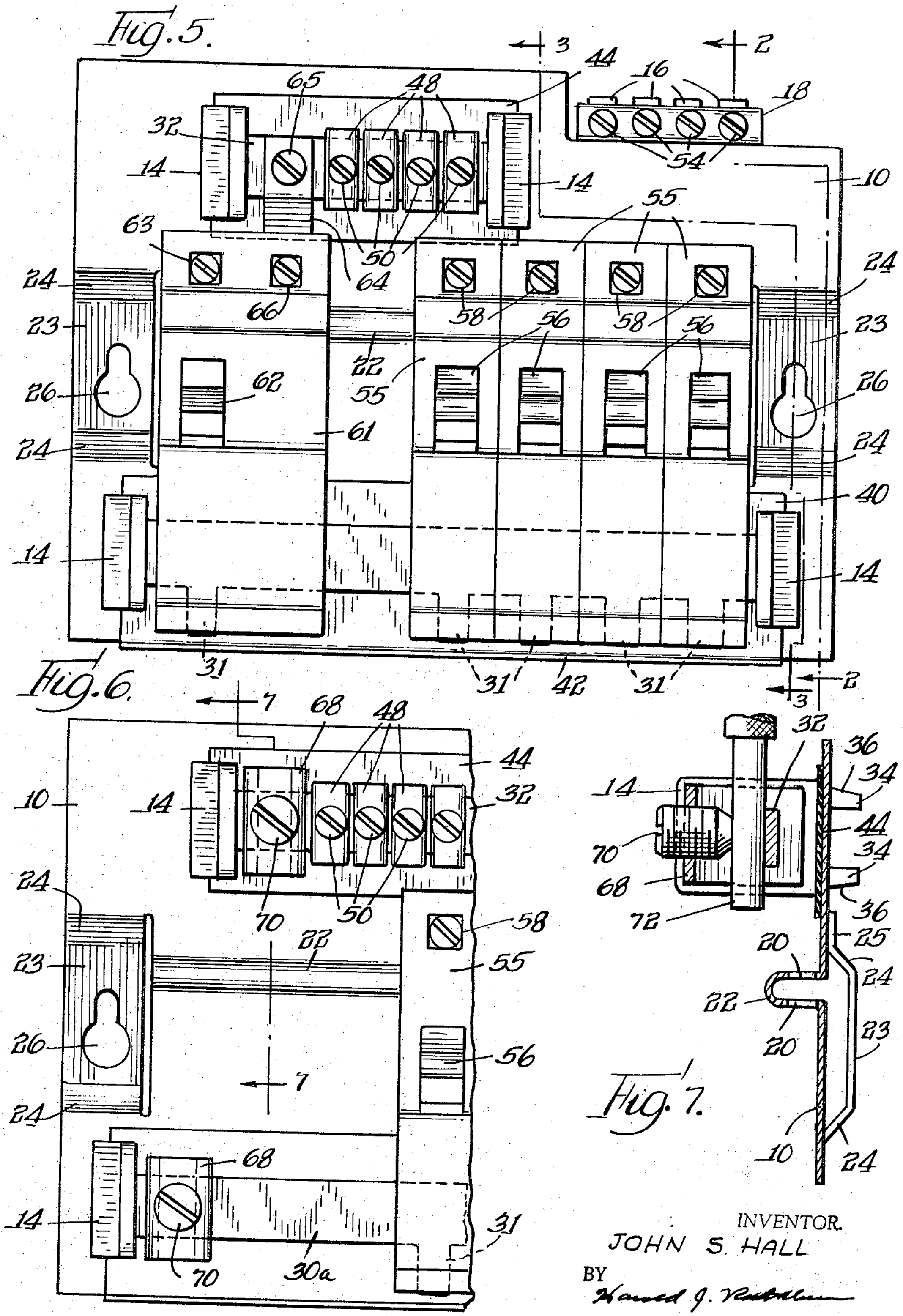
INVENTOR.
JOHN S. HALL
BY
Harold J. Rathbun
ATTY.

United States Patent Office 3,335,330

Patented Aug. 8, 1967

3,335,330

MOUNTING PAN ASSEMBLY FOR ELECTRICAL PANELBOARD

John S. Hall, Aldbourne, England, assignor, by mesne assignments, to Square D Company, Park Ridge, Ill., a corporation of Michigan Filed July 15, 1964, Ser. No. 382,738
Claims priority, application Great Britain, Mar. 13, 1964, 10,611/64
10 Claims. (Cl. 317—119)

This invention relates generally to electrical panelboards for circuit breakers and more particularly to an interior mounting pan assembly constructed and arranged for the mounting of circuit breakers thereon of the type having a pair of plug-in terminal jaws adjacent one end and a mechanical mounting clip adjacent the other end.

An object of the invention is to provide a more simply constructed mounting pan assembly for electrical panelboards than has formerly been provided.

Another object is to provide an improved mounting rail for the mechanical mounting clips of electrical circuit breakers.

A further object is to provide an improved earthing or bonding bar for mounting pan assemblies of electrical panelboards.

Still another object is to provide improved means for mounting bus bars on the mounting pan of an electrical panelboard while at the same time securing a sheet of insulating material therebetween.

Other objects will appear when the following detailed description of the invention is considered along with the accompanying drawings in which:

FIG. 1 is an exploded perspective view of an interior mounting pan assembly for an electrical panelboard, the assembly being constructed in accordance with the invention and certain parts being omitted for clarity;

FIG. 2 is a sectional view of the interior mounting pan assembly of FIG. 5 taken generally along the line 2—2 thereof;

FIG. 3 is a sectional view taken generally along the line 3—3 of FIG. 5 but omitting the circuit breakers and two-pole main switch thereof;

FIG. 4 is a fragmentary sectional view taken along the line 4—4 of FIG. 3;

FIG. 5 is a front elevational view of an interior mounting pan assembly constructed in accordance with the invention and having a two-pole main switch and four single-pole circuit breakers mounted thereon;

FIG. 6 is a fragmentary view similar to FIG. 5 but showing an embodiment of the interior mounting pan assembly for use without the two-pole main switch of FIG. 5; and FIG. 7 is a fragmentary sectional view taken generally along the line 7—7 of FIG. 6.

A mounting pan assembly constructed in accordance with the invention includes a mounting pan 10 formed from a rectangular piece of sheet metal and shown best in FIG. 1. Certain portions of the assembly are designed to have a snap-on type connection with the mounting pan 10. As an illustration of one way in which the snap-on type connection may be provided, two pairs of spaced slots 12 are formed in the mounting pan 10 for the reception of two pairs of mounting members 14 to be later described.

A longitudinal edge portion of the mounting pan 10 is slotted adjacent one end to provide a plurality of edgewise aligned tongues 16 spaced from each other and formed integrally with the mounting pan. The free end portions of the tongues 16 are bent over toward an inner or rear side of the mounting pan for retaining an earthing or bonding bar or clamp 18 to be later described.

Two adjacent rows of generally rectangular holes 20, preferably equally spaced from each other in a row and each hole in one row being aligned with a hole in the other row, are provided in the mounting pan 10, only one row appearing in FIG. 1. An outwardly or forwardly projecting generally U-shaped rib portion or mounting rail 22 is formed in the mounting pan 10 with one of the rows of holes 20 in each leg or side portion of the mounting rail.

Adjacent opposite ends of the mounting rail 22 and before the forming thereof, a pair of L-shaped slits or slots is formed in the mounting pan 10 to provide a pair of inwardly offset mounting feet 23 each having a pair of inwardly offsetting portions 24. The free end portions 25 of the mounting feet 23 overlap the adjacent portions of the mounting pan 10 and are secured thereto as by spot welding. Each mounting foot 23 is provided with a keyhole-shaped hole 26 for receiving a mounting screw (not shown). The forming of the mounting rail 22 brings the portions of the mounting pan 10 on each side thereof closer together to provide the material required for the inwardly offsetting portions 24 and the overlapping free end portions 25 of the mounting feet 23 out of the original piece of sheet metal from which the mounting pan 10 is formed. The mounting rail 22 acts as a stiffening rib for the mounting pan 10, enabling it to be formed out of relatively thin material.

The mounting members 14 are formed of an insulating material having a degree of resiliency, such as nylon. Each mounting member 14 includes a generally rectangular body portion 28 having a recess in one side thereof for receiving an end portion of a conductive strap or bar, such as a bus bar 30 having a plurality of tongue portions 31 extending therefrom, or a neutral bar 32. Further, each mounting member 14 is provided with a snap-on type connection to the mounting pan 10. For example, each mounting member 14 may be provided with a pair of leg portions 34 the outer sides of which are chamfered as at 36 and respectively provided with a pair of grooves 37.

A sheet 40 of insulating material is provided between the mounting pan 10 and the bus bar 30. The sheet 40 is provided with a forwardly or outwardly extending portion 42 and with a pair of oppositely and endwise extending tongue portions 41 which respectively overlie one of the pairs of slots 12 and extend between the leg portions 34 of the mounting members 14. In assembling, the sheet 40 is placed in position and a pair of mounting members 14 having the bus bar 30 mounted therebetween is snapped into the respective pair of slots 12. The leg portions 34 of each mounting member 14 are squeezed together during insertion in one of the slots 12 by engagement of the chamfered surfaces 36 with the portions of the mounting pan 10 defining the longitudinally opposite ends of the respective slot 12, and when the mounting pan 10 becomes aligned with the grooves 37, the leg portions 34 spring outwardly back to their normal relative position to secure the mounting member in position on the mounting pan.

The slots 12 of the other pair are spaced closer together because the neutral bar 32 is shorter than the bus bar 30. However, all the slots 12 are preferably identical in size and a pair of mounting members 14 preferably identical to those for the bus bar 30 is provided for the mounting of the neutral bar 32. A sheet 44 of insulating material having a pair of oppositely and endwise extending tongue portions 45 is provided between the neutral bar 32 and the mounting pan 10, the sheet 44 and neutral bar 32 being secured in position in the same manner as the sheet 40 and neutral bar 30 by the respective pair of mounting members 14.

A plurality of generally U-shaped clamping members or neutral wire connectors 48 are provided on the neutral bar 32 as shown in FIGS. 5 and 6. One clamping member 48 is shown separately in FIG. 1, each leg portion thereof being provided with a slot 49 for receiving the neutral bar 32 and the bight portion thereof being provided with a threaded hole for receiving a clamping screw 50.

The earthing or bonding bar 18 is a generally U-shaped clamping member each leg or side portion of which is provided with a plurality of holes 52 for respectively receiving the tongues 16 of the mounting pan 10 and the bight portion of which is provided with a plurality of threaded holes for respectively receiving a plurality of clamping screws 54. The holes 52 are larger than the cross sectional area of the tongues 16 whereby in addition to the tongues 16 they are adapted to receive the end portions of electrical conductors (not shown).

A plurality of thermally and magnetically operable single-pole circuit breakers 55 each having a manual operating handle 56 are shown mounted on the mounting pan assembly in FIGS. 2, 5, and 6. Each circuit breaker 55 is provided with a mounting clip 57 (FIG. 2) for mechanically mounting the circuit breaker on the mounting rail 22 of the mounting pan 10. As will be understood, the opposite leg portions of each clip 57 are resiliently forced apart as the mounting rail 22 is received therebetween, and they return only partially back toward their original unstressed position as they are partially received in an opposite pair of the holes 20 in the mounting rail. As will also be understood, each circuit breaker 55 is provided with a load terminal 58 (FIG. 5) and with a line terminal 59 (FIG. 2) of the plug-in type and including an opposed pair of terminal jaws adapted to receive a tongue portion 31 of the bus bar 30 therebetween.

The neutral bar 32 is provided with a threaded hole 60 (FIG. 1) for use with the embodiment of the invention shown in FIGS. 2 and 5, in which a two-pole main switch 61 having a single common operating handle 62 is provided for the panelboard. A first pole of the switch 61 plugs on the leftmost tongue portion 31 of the bus bar 30 as viewed in FIG. 5 to feed the bus bar 30 from a power line (not shown) securable to a terminal 63 of the first pole, and the second pole is provided with a terminal strap 64 connected to the neutral bar 32 by a screw 65 threaded into the hole 60. A neutral or return line conductor (not shown) may be secured to a terminal 66 of the second pole.

FIGS. 6 and 7 show an embodiment of the invention in which no main switch 61 is used and the power lines may be connected directly to a bus bar **30*a* and the neutral bar 32. The bus bar 30*a* is identical to the bus bar 30 of FIGS. 1–5, except that it has no tongue portion 31 adjacent its leftmost end as viewed in FIG. 6. In this embodiment, a pair of generally U-shaped clamping members 68 are provided respectively on the bus bar 30*a* and neutral bar 32, each of the leg portions of each clamping member having a slot therethrough for reeciving the respective bar and the bight portion of each clamping member being provided with a threaded hole for receiving a clamping screw 70. The clamping members 68 and screws 70 are larger than the neutral wire connectors 48 and screws 50 and serve as line terminal connectors. FIG. 7 shows a neutral or return line conductor 72 clamped to the neutral bar 32**.

It will be noted that the insulating sheets 40 and 44, the earthing bar 18, the neutral bar 32, and the bus bar 30 may be quickly and easily assembled with the mounting pan 10 without the use of any screws other than wire clamping screws, and that the earthing bar 18 with its screws 54 may clamp bonding or earthing wires directly against the mounting pan 10. Further, the mounting rail 22 is an integral part of the mounting pan 10 and serves as a strengthening rib therefor, and the mounting feet 23 are also an integral part of the mounting pan, the inwardly offsetting portions 24 and the lapping spot welded portions 25 being formed in conjunction with the forming of the mounting rail 22.

Various modifications may be made in the structure shown and described without departing from the spirit and scope of the invention.

This invention is claimed as follows:

1. For use in mounting a plurality of electric circuit breakers in a panelboard, each of said circuit breakers having a terminal of the plug-in type adjacent one end and a resilient mounting clip including a pair of opposed leg portions adjacent the other end, a mounting pan comprising a piece of sheet metal having an outwardly projecting generally U-shaped elongated mounting rail formed integrally therewith, said mounting rail including a pair of opposed side wall portions connected by a bight portion, said side wall portions being spaced sufficiently close to each other as to enable said bight portion to be received between the opposed leg portions of a circuit breaker mounting clip, each of said side wall portions having a row of holes spaced longitudinally of said mounting rail, and the holes of each of said side wall portions being aligned respectively with the holes of the other of said side wall portions, whereby opposed leg portions of a mounting clip of a circuit breaker may be partially received respectively in a pair of opposed holes disposed respectively in said opposed side wall portions of said mounting rail.

2. A mounting pan as claimed in claim 1, wherein said piece of sheet metal includes a pair of inwardly offset mounting feet integral therewith and disposed adjacent opposite ends of said mounting rail.

3. A mounting pan assembly for an electrical panelboard, said assembly comprising a sheet metal mounting pan having a row of edgewise aligned tongues spaced from each other and formed integrally with the mounting pan and extending in the same direction from the remainder thereof, an elongated generally U-shaped clamping member mounted on said tongues and having a row of spaced holes in each leg portion thereof respectively aligned with the holes in the other leg portion, and a row of spaced clamping screws threadedly mounted in the bight portion of said generally U-shaped clamping member and respectively aligned with the holes in each of said leg portions, said tongues extending respectively through the holes in each of said leg portions transversely of said generally U-shaped clamping member, said holes being larger than the cross sectional area of said tongues whereby in addition to said tongues they are adapted to receive the end portions of electrical conductors, and said screws being adapted to clamp said end portions of said electrical conductors directly to said tongues.

4. A mounting pan assembly as claimed in claim 3, wherein the free end portions of said tongues are bent over away from the bight portion of said generally U-shaped clamping member to aid in retaining said clamping member on said tongues.

5. A mounting pan assembly for an electrical panelboard, said assembly comprising a sheet metal mounting pan, a pair of insulating mounting members, cooperative snap-on type connection means on said mounting members and mounting pan, said mounting members being mounted in spaced relationship on said mounting pan by said connection means, and an electrically conductive bar having a pair of opposite end portions mounted respectively on said mounting members and held thereby in spaced relation to said mounting pan.

6. A mounting pan assembly as claimed in claim 5, wherein said mounting pan is provided with a pair of spaced slots and each of said mounting members includes a pair of spaced leg portions received in one of said slots.

7. A mounting pan assembly as claimed in claim 5, wherein said mounting pan is provided with a pair of spaced slots and each of said mounting members includes a pair of spaced leg portions received in one of said slots, and wherein a sheet of insulation is provided between said mounting pan and said electrically conductive bar, said sheet of insulation including a pair of oppositely extending tongue portions respectively received between said spaced leg portions of said mounting members.

8. A mounting pan assembly as claimed in claim 5, wherein said electrically conductive bar includes a plurality of transversely extending portions each adapted to be clamped by a pair of plug-in terminal jaws of a circuit breaker.

9. A mounting pan assembly as claimed in claim 5, including a plurality of generally U-shaped clamp body members mounted on said electrically conductive bar, each of said clamp body members including a pair of opposed side wall portions connected by a bight portion and each of said clamp body members having a pair of opposed holes disposed respectively in said side wall portions, said electrically conductive bar being received in said holes of said clamp body members, and a plurality of clamping screws disposed respectively in the bight portions of said clamp body members.

10. For use in mounting a plurality of electric circuit breakers in a panelboard, each of said circuit breakers having a terminal of the plug-in type adjacent one end and a resilient mounting clip including a pair of opposed leg portions adjacent the other end, a mounting pan comprising a generally flat, generally rectangular piece of sheet metal partially defined by a pair of spaced, opposite, generally parallel edges and including an elongated generally U-shaped mounting rail and a pair of spaced mounting feet, said mounting rail and mounting feet being integral with said piece of sheet metal, said mounting rail projecting in one direction from one side of said piece of sheet metal and said mounting feet projecting in an opposite direction from the other side of said piece of sheet metal, said mounting rail extending generally perpendicularly to said edges of said piece of sheet metal and opposite end portions of said mounting rail being spaced respectively inwardly of said edges of said piece of sheet metal, said mounting feet being disposed respectively between said opposite end portions of said mounting rail and said edges of said piece of sheet metal, said mounting rail including a pair of opposed side wall portions connected by a bight portion, said side wall portions being disposed sufficiently close to each other as to enable said bight portion to be received between the opposed leg portions of a circuit breaker mounting clip, and each of said mounting feet including a tongue portion of said piece of sheet metal extending transversely of said mounting rail and having its base disposed on one side of said mounting rail and its tip disposed on the other side of said mounting rail in overlapping engagement with a respective portion of the remainder of said piece of sheet metal.

References Cited

UNITED STATES PATENTS

| | | | |
|---|---|---|---|
| 2,876,394 | 3/1959 | Gerrish | 317—119 |
| 2,905,923 | 9/1959 | Hammerly | 317—119 X |
| 3,122,604 | 2/1964 | Cook et al. | 174—51 |

ROBERT K. SCHAEFER, *Primary Examiner.*

K. H. CLAFFY, *Examiner.*

J. J. BOSCO, R. S. MACON, *Assistant Examiners.*